July 31, 1951     T. KOCH     2,562,796
PROCESS FOR PREPARING LINEAR POLYAMIDES
Filed Aug. 3, 1948
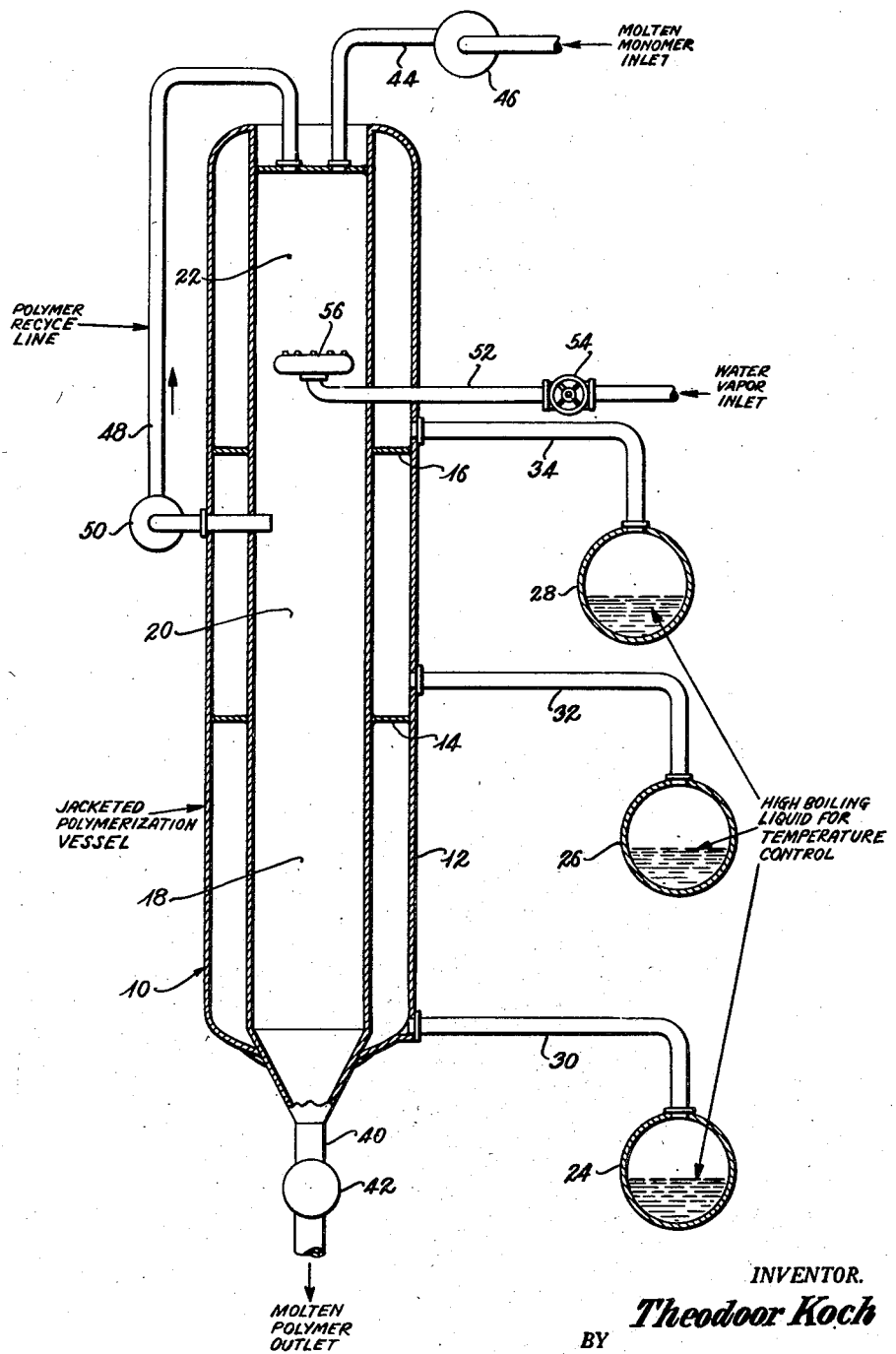
INVENTOR.
Theodoor Koch
BY
Albin F. Knight
ATTORNEY Patented July 31, 1951

2,562,796

UNITED STATES PATENT OFFICE 2,562,796

PROCESS FOR PREPARING LINEAR POLYAMIDES

Theodoor Koch, Oosterbeek, Netherlands, assignor to American Enka Corporation, Enka, N. C., a corporation of Delaware Application August 3, 1948, Serial No. 42,283
In the Netherlands November 28, 1947

2 Claims. (Cl. 260—78)

This invention relates to the preparation of high molecular weight linear polyamides obtained by the polymerization or condensation of omega-lactams of the general formula

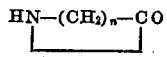

where $n$ is an integer at least five. More particularly, the invention relates to the preparation of polycondensation products of the kind indicated, by procedure that involves condensing omega-lactams where $n$ is an integer at least five.

One of the principal objects of the present invention is to provide a new and improved method for preparing macromolecular polycondensation products from monomeric omega-lactams of the above formula and having at least five methylene groups. A still further object of the invention is to provide a method for preparing high molecular weight linear polyamide condensation products from omega-lactams of the kind indicated, by a continuous method wherein the monomeric starting material is introduced at one part of the reaction zone while an equivalent quantity of the polymeric reaction product is withdrawn at another point of the reaction zone.

The manner in which these and other objects and features of the invention are attained will appear more fully from the following description thereof, in which reference is made to typical and preferred procedures in order to indicate more fully the nature of the invention, without intending however to limit the invention thereby.

It is already known that macromolecular polycondensation products of the linear polyamide type comprising structural units having the general formula . . . —NH(CH$_2$)$_n$CO— . . . may be made from the corresponding omega-lactams of the general formula

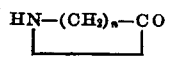

where $n$ is an integer at least five, by heating the monomeric lactam with water under pressure (Netherlands Patent No. 54,864). Other methods are known wherein the opening of the lactam ring is brought about by various means, for example, in the Netherlands Patent No. 52,466 by heating the monomeric omega-lactam with a small quantity of alkali metal, and in the German patent application I 61,608 as well as in the French Patent No. 860,533 by the use of various inorganic and organic catalysts. A serious disadvantage of processes of the last-mentioned kind is that the catalysts that are employed necessarily remain in the linear polyamide product as foreign substances, and can only be removed with great difficulty if at all. On the other hand, when bringing about the opening of the lactam ring with the aid of a relatively large quantity of water under pressure according to the Netherlands Patent No. 54,864 above, an autoclave or equivalent pressure vessel is required and the process cannot easily be carried out in a continuous manner.

It has also been proposed (Swiss Patent No. 242,616) to employ 6-amino-caproic acid, or a low molecular polycondensation product thereof, as a ring-opening catalyst for 6-caprolactam. However, it is very difficult to obtain the omega-amino carboxylic acids in pure form and, since even slight traces of impurities are sufficient to block the active end groups during the polycondensation step, it is apparent that such a process may be prohibitively expensive by virtue of the necessity for starting from very pure raw materials.

The reaction mechanism according to the process of the aforesaid Swiss patent is apparently based upon the assumption that during the heating of the 6-amino caproic acid, or the low molecular weight condensation products thereof, water is set free which, at the instant of its formation or immediately thereafter, exerts a splitting action on the caprolactam ring.

According to the present invention, however, it has been discovered that polycondensation products of the linear polyamide type, practically free from lactams, can be formed by heating monomeric omega-lactams of the kind indicated with high molecular polyamides (for example, those derived from amino carboxylic acids or from the condensation of aliphatic diamines with aliphatic dicarboxylic acids) in order to promote the reaction: lactams→linear polyamides.

It is apparent that the polymerization of the omega-lactams according to the present invention requires an explanation other than that upon which apparently is based the process of the Swiss Patent No. 242,616, inasmuch as a further formation of water can no longer be expected when employing high molecular weight linear polyamides as the agents by which the polycondensation of omega-lactams is brought about. It may be postulated that the favorable effects on the rate of conversion of the omega-lactams into the desired linear polyamides according to the present invention may be of an auto-catalytic character by virtue of the presence of the high molecular weight linear polyamides, but in advancing such a theory it is to be understood that the present inventor does not regard himself as bound by this or any other theory of reaction.

The condensation reaction proceeds smoothly and rapidly when the reaction mass comprising the monomeric omega-lactam material is heated in the presence of a high molecular weight linear polyamide, and with or without the presence of a small amount of added water depending upon considerations to be mentioned shortly hereinafter. Where reference is made to a "high molecular weight linear polyamide" as employed according to the present invention in order to promote the condensation or polymerization of the monomeric omega-lactam to linear polyamide, it is to be understood that the limit indicated for such linear polyamides in the literature (see for example the Netherlands Patent No. 49,796), and understood by those skilled in this art, is intended. In other words, it is to be understood that high molecular weight linear polyamides possessing an intrinsic viscosity of at least 0.4, as measured in meta-cresol solution, are meant.

In carrying out the conversion of the omega-lactams to linear polyamides in accordance with the process of the present invention, it is of course necessary in the beginning to have at one's disposal a quantity of the desired high molecular weight linear polyamide. For this purpose it is of considerable advantage to employ residues or waste materials from preceding operations, although specially prepared high molecular weight linear polyamides may be employed if desired. Of course it is possible to use other, and more directly obtained, linear polyamides, for example, polymethylene carbonamides derived from amino-carboxylic acids, polyamides from aliphatic diamines and dicarboxylic acids or from substituted derivatives thereof, such as N-alkyl derivatives, and the like, so long as these linear polyamides are of high molecular weights corresponding to the intrinsic viscosity limits mentioned above.

In view of the fact that these high molecular weight linear polyamides are readily soluble in the monomeric omega-lactams at the elevated temperatures at which the condensation or polymerization reaction is preferably carried out, the course of the process is still further simplified. For example, the reaction can be started from a small quantity of the omega-lactam-linear polyamide mixture. This mixture is heated to an elevated temperature and, in accordance with the rate of conversion of the omega-lactam present, fresh quantities of monomeric material are added. In this way the process can be carried out in a continuous manner, the only restriction being the capacity of the reaction vessel. Care need only be taken that a suitable relationship be maintained between the quantities of linear polyamide and monomeric omega-lactam, which relationship is dependent on the properties of the particular reaction mixture being processed. In general, it will be found that the conversion or polymerization will take place with increasing ease as the number of carbon atoms in the monomeric omega-lactam ring increases.

Generally speaking, it is preferred to employ as the high molecular weight linear polyamides for promoting the polymerization or condensation of the omega-lactams, a linear polyamide that is characterized by the same structural unit as that of the polyamide that is to be produced from the monomeric lactam itself. In other words, the said linear polyamide may be regarded as being characterized by structural units of the general formula ... —NH(CH$_2$)$_m$CO— ... where $m$ and $n$ represent the same integer.

After the reaction is completed the final polymerization products may be readily processed to threads, fibers, films, plastic masses, etc.

Another manner in which the process of the present invention may be carried out is as follows: The condensation or polymerization takes place in a vertical, externally-heated reaction tube. Into this tube a quantity of waste high molecular weight linear polyamide in molten form is disposed, the charge almost entirely filling the tube. Into the upper portion of the tube is then charged the monomeric omega-lactam material, and this is admixed in the upper zone of the tube with the high molecular weight linear polyamide already present therein. In proportion to the rate of polyamide formation from the lactam, high molecular weight linear polyamide product is drawn off from the bottom of the reaction tube, while the level of material in the reaction tube is kept substantially constant by the introduction of fresh monomeric lactam material.

It is also of advantage to establish a circulatory flow of molten material, including monomeric lactam undergoing reaction, from (a) a point intermediate the place of introduction of monomeric feed to the reaction zone and the place of removal of high molecular linear polymeric product to (b) a point adjacent the place of introduction of monomeric feed to the reaction zone.

Moreover, it frequently is of advantage to divide the reaction tube into a plurality of zones which can be adjusted simultaneously to various temperatures.

As it is necessary in accordance with the presently assumed reaction mechanism of linear polyamide formation from omega-lactam that free end groups can be formed, and since in any case a small quantity of water is required for that purpose, under certain circumstances it may be desirable to add a small quantity of water. This is particularly true in case the omega-lactam and/or the initial high molecular weight linear polyamide material is absolutely dry.

Theoretically the quantity of water to be added can be very small. At a molecular weight of about 13,000 (which represents a value that may be considered typical or normal for polycapronic amide made from omega-caprolactam) the presence of one mol of water to one mol of polymer will be sufficient to allow this size of molecule to be formed and exist. Since the molecular weight of the monomeric material from which this particular polymer is formed is about 113, it follows that only about one mol of water per 115 mols of monomer (13,000/113) will be required. This is considerably less than the quantity of water that would be required to convert pure omega-lactam to linear polyamide without the addition of high molecular polyamide in accordance with the present invention. Thus, in accordance with the Netherlands Patent No. 54,864 at least one mol of water per mol of lactam is required as the minimum quantity of water for the conversion. Even according to the French Patent No. 860,533, more than 1/10 mol of water per mol of lactam is required.

It is satisfactory to employ for the process of the present invention monomeric lactams that are air-dried, i. e., wherein the moisture content is in equilibrium with the normal moisture content of the atmosphere. It is only when processing excessively dried raw materials, for example, when the polymerization vessel is directly connected to a lactam-rectifying apparatus, that it may be necessary to add an extra quantity of moisture. When it is necessary to supply additional moisture, this can be done very readily by introducing a small quantity of water vapor into the reaction mixture undergoing polymerization or condensation. In general, the quantity of water or water vapor added for this purpose is kept as small as possible, and in any case lower than one mol of water to 10 mols of omega-lactam, and preferably even lower than 1 mol of water to 50 mols of omega-lactam in the reaction mixture.

It will be observed that in view of the high reaction temperatures that are necessary as pointed out hereinafter, the effective employment of such small amounts of water in open reaction vessels would be practically impossible.

The reaction temperatures for the polymerization or condensation according to the present invention may be varied within wide limits, depending upon the composition of the initial substances, the time available for the reaction and the requirements for the degree of polymerization in the final product. In practice, the temperatures usually employed will lie between 170° and 300° C.

In order to indicate still more fully the nature of the present invention, the following example of typical procedure is set forth in conjunction with a description of the apparatus shown in the accompanying drawing, it being understood that this description is presented by way of illustration only, and not as limiting the scope of the invention. Conditions for the polycondensation of caprolactam are here described by way of example.

*Example*

A polymerization vessel 10 is provided having a jacket 12 through which heat exchange fluid may be circulated. The jacket is provided with partitions 14 and 16 which divide the entire vessel 10 into three sections 18, 20 and 22, each of which may be maintained at different temperatures by vapor from a high boiling heat exchange liquid in boilers 24, 26 and 28 introduced into the jacketed sections by lines 30, 32 and 34, respectively. A suitable high boiling heat exchange liquid is the so-called Dowtherm liquid.

In order to initiate operation in accordance with the process of the present invention, the jacketed polymerization vessel 10 is filled with molten linear polyamide of an intrinsic viscosity (in meta-cresol) of 0.8, which may be obtained as a residue from a previous run or otherwise. This linear polyamide corresponds in structure to that of the linear polyamide obtained by condensation of the monomeric omega-lactam employed, in this instance omega-caprolactam. The molten linear polyamide is introduced into the polymerization vessel 10 until the vessel is filled substantially to the top, whereupon the level of material in the vessel is maintained substantially constant by suitable liquid-level control means (not shown).

The high molecular weight linear polyamide product is discharged continuously from the bottom of the polymerization vessel 10 via line 40 under the influence of pump 42. At the same time molten monomeric caprolactam is supplied to vessel 10 at substantially the same rate via line 44 under the influence of pump 46, thereby keeping the level of material in the polymerization vessel 10 substantially constant.

Polymer recycle line 48, provided with pump 50, communicates with vessel 10 at spaced points and is adapted to return a substantial quantity of the reaction mixture containing partially polymerized monomer from approximately the central portion of the reaction vessel to the top or a point near the top of the reaction vessel 10. As illustrated, reaction material is recycled from the zone 20 to the top of the reaction vessel, the quantity of reaction material recycled preferably being approximately equal to the volume of the monomer supplied via line 44. Polymerization of the charge to the desired extent is completed in the lower-most zone 18 of the polymerization vessel 10, whereupon the polymer product is withdrawn via line 40.

When the initial caprolactam, or other omega-lactam, contains less than 1% moisture, a small quantity of steam or water vapor is introduced into the reaction vessel, for example, at the uppermost zone 22, via line 52 having a valve 54 therein. This line 52 terminates in a nozzle or distributor 56 for securing intimate admixture of the steam or water vapor thus introduced with the mixture in the reaction vessel.

If desired, the upper portion of the polymerization vessel 10 may communicate with a reflux condenser (not shown) in order to return evaporating monomer.

Moreover, it may be desirable to protect the liquid reaction mixture undergoing the polymerization or condensation step against undesired oxidation by means of an inert gas layer (e. g., nitrogen) introduced into the top of the polymerization vessel 10 and above the surface of the reaction mixture contained therein.

In general, it may be found desirable to maintain the temperature in the central zone slightly higher than that of the lower zone and the temperature of the latter slightly higher than that of the upper zone. For example, in polymerizing omega-caprolactam the preferred temperatures for the central zone 20 are about 275° C., for the upper zone 22 about 235° C., and for the lower zone 18 about 250° C.

While a specific example of a preferred method embodying the present invention has been described above, it will be apparent that many changes and modifications may be made in the methods of procedure. It will therefore be understood that the example cited and the particular proportions and methods of procedure set forth above are intended to be illustrative only, and are not intended to limit the scope of the invention.

What is claimed is:

1. A method for producing a high molecular weight linear polyamide by condensation of an omega-lactam of the general formula

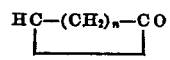

where $n$ is an integer at least 5, which comprises continuously introducing into a heated reaction zone a mixture consisting essentially of (a) said omega-lactam, (b) a molten high molecular weight linear polyamide having an intrinsic viscosity of at least 0.4 and characterized by structural units of the general formula . . . —NH(CH₂)ₘCO— . . . where m and n represent the same integer, and (c) water in a significant amount less than 1 mol of water per 50 mols of omega-lactam in the reaction mixture, and in the absence of any additional chemically reactive material; continuously withdrawing a portion of the reaction mixture containing partially polymerized omega-lactam from the reaction zone at a point spaced from the point of introduction of the omega-lactam feed material; continuously re-introducing said withdrawn portion into the reaction zone near the point of introduction of omega-lactam feed material thereby creating a continuously recycling mass of reaction mixture; and subjecting the reaction mixture containing partially polymerized omega-lactam, other than that portion which is withdrawn and recycled, to further polymerization in a heated reaction zone; said reaction zones being maintained at temperatures between 170° and 300° C.

2. A method as in claim 1 wherein the said water content of the reaction mixture is derived from moisture present in the omega-lactam feed material as initially charged to the reaction zone.

THEODOOR KOCH.

REFERENCES CITED

The following references are of record in the file of this patent:

UNITED STATES PATENTS

| Number | Name | Date |
|---|---|---|
| 1,811,290 | Badger | June 23, 1931 |
| 2,283,872 | Pratt et al. | May 19, 1942 |

FOREIGN PATENTS

| Number | Country | Date |
|---|---|---|
| 870,484 | France | Dec. 12, 1941 |

OTHER REFERENCES

Serial No. 309,376, Friederich et al. (A. P. C.), published Apr. 20, 1943.